United States Patent [19]

Mukogawa

[11] Patent Number: 5,586,019
[45] Date of Patent: Dec. 17, 1996

[54] VOLTAGE CONVERTER

[75] Inventor: Masashi Mukogawa, Kanagawa, Japan

[73] Assignee: Murata Manufacturing Co., Ltd., Japan

[21] Appl. No.: 250,907

[22] Filed: May 31, 1994

[30] Foreign Application Priority Data

Jun. 1, 1993 [JP] Japan .................. 5-168312

[51] Int. Cl.⁶ .................................................. H02M 7/02
[52] U.S. Cl. .................... 363/93; 323/261; 323/310; 323/249
[58] Field of Search .................... 323/241, 249, 323/310, 261; 363/25, 139, 172, 91, 93

[56] References Cited

U.S. PATENT DOCUMENTS

| | | | |
|---|---|---|---|
| 3,348,130 | 10/1967 | Jensen | 323/282 |
| 4,217,632 | 8/1980 | Bardos et al. | 363/91 |
| 4,389,581 | 6/1983 | Iwasaki | 307/419 |
| 4,447,866 | 5/1984 | Reeves | 363/93 |
| 4,811,187 | 3/1989 | Nakajima et al. | 363/25 |

*Primary Examiner*—Peter S. Wong
*Assistant Examiner*—Shawn Riley
*Attorney, Agent, or Firm*—Ostrolenk, Faber, Gerb & Soffen, LLP

[57] ABSTRACT

In the voltage converter, a current flowing through a primary coil of a voltage transformer is turned on/off by FETs, an AC voltage induced at a secondary coil of voltage transformer is rectified and applied to a choke coil including two coils, a saturable choke coil and a flywheel diode are connected between two coils of the choke coil and the ground, and a saturable reactor is reset in response to the output voltage, whereby the output voltage is adjusted.

6 Claims, 2 Drawing Sheets

FIG. 3 (a)
FIG. 3 (b)
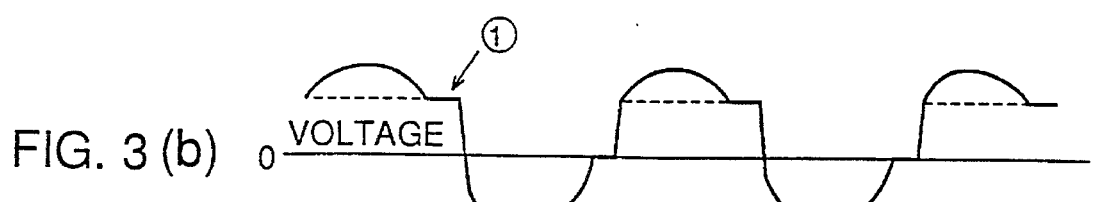
FIG. 3 (c)
FIG. 3 (d)
FIG. 3 (e)
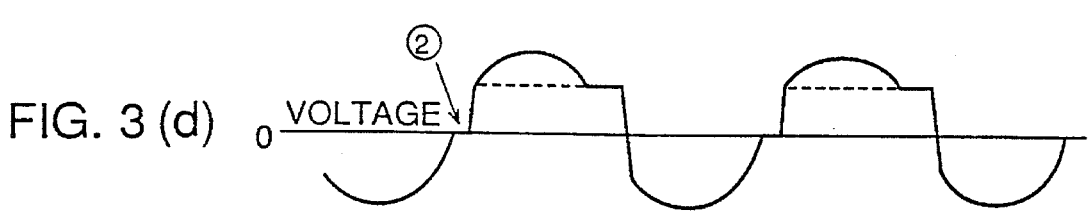
FIG. 3 (f)
FIG. 3 (g)
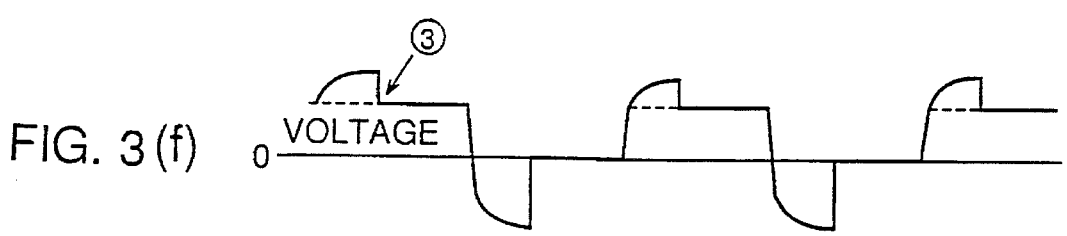

VOLTAGE CONVERTER

BACKGROUND OF THE INVENTION

1. Field of the Invention

The present invention relates to a voltage converter. More specifically, the present invention relates to a switching type voltage converter widely used as a power source or a converter for an electronic equipment.

2. Description of the Background Art

FIG. 1 is a circuit diagram of a conventional voltage converter having a plurality of voltage outputs. Referring to FIG. 1, a DC voltage is applied from a DC power source 1 to a driving circuit 2. Driving circuit 2 turns on/off FETs 31 and 32 as switching elements alternately at a period of a prescribed frequency, by applying driving signals to the gates of FETs 31 and 32. FET 31 has its drain connected to one end of a primary coil 5 of a voltage transformer 4, while FET 32 has its drain connected to the other end of primary coil 5 of the voltage transformer 4. To a center tap of primary coil 5, a DC voltage is applied from DC power source 1. FETs 31 and 32 have their sources connected to a negative terminal of DC power source 1.

The voltage transformer 4 includes two secondary coils 61 and 62. Secondary coil 61 has one end connected to an anode of a rectifier diode D1, and the other end connected to an anode of a rectifier diode D2. Rectifier diodes D1 and D2 have their cathodes connected to one end of a choke coil L1, and the other end of choke coil L1 is connected to a voltage output terminal V1 OUT. A center tap of secondary coil 61 is connected to a ground terminal GND1, and between voltage output terminal V1 OUT and the ground terminal GND1, a smoothing capacitor C1 is connected.

Secondary coil 62 has one end connected to an anode of a rectifier diode D3, and the other end connected to an anode of a rectifier diode D4. Rectifier diodes D3 and D4 have their cathodes connected to one end of a choke coil L2, and the other end of choke coil L2 is connected to a voltage output terminal V2 OUT. A center tap of secondary coil 62 is connected to the ground terminal GND2, and between voltage output terminal V2 OUT and the ground terminal GND2, a smoothing capacitor C2 is connected.

The operation of the voltage converter shown in FIG. 1 will be described. In response to the driving signal from driving circuit 2, FETs 31 and 32 turn on/off alternately. When FET 31 turns on, current flows through the upper portion of primary coil 5 of voltage transformer 4, and as a result, an AC voltage is induced at upper portions of secondary coils 61 and 62. The AC voltage is rectified by rectifier diodes D1 and D3, made smooth by choke coil L1 and smoothing capacitor C1 and by choke coil L2 and smoothing capacitor C2, respectively, and DC voltage is output to voltage output terminals V1 OUT and V2 OUT. Thereafter, when FET 31 turns off and FET 32 turns on after a prescribed delay, current flows through the lower portion of primary coil 5. As a result, an AC voltage is induced at lower portions of secondary coils 61 and 62. The AC voltage is rectified by rectifier diodes D2 and D4, made smooth by choke coil L1 and smoothing capacitor C1 and by choke coil L2 and smoothing capacitor C2, respectively, and DC voltage is output from voltage output terminals V1 OUT and V2 OUT.

In the conventional voltage converter shown in FIG. 1, a plurality of DC voltages can be provided. However, respective DC voltages provided are fixed. However, it is sometimes necessary for some electronic equipments receiving DC voltages from such a voltage converter to receive different DC voltages. In such a case, it is necessary to provide a regulator at voltage output terminal V1 OUT or V2 OUT, in order to further convert the DC voltage to obtain a desired DC voltage. This requires an additional regulator, making device structure complicated, increasing the number of parts and hence manufacturing cost. In addition, efficiency in operation is decreased.

SUMMARY OF THE INVENTION

Therefore, an object of the present invention is to provide a voltage converter capable of providing a desired DC voltage without a regulator.

Another object of the present invention is to provide a voltage converter capable of providing mutually different DC voltages, when a plurality of DC voltages are provided.

Briefly stated, the present invention provides a voltage converter switching a current flowing through a primary coil of a voltage transformer and performing a full-wave rectification of AC voltage provided from a secondary coil, wherein a choke coil includes first and second coils connected in series, the first coil receiving one of rectified voltages and the second coil receiving another; a first switching element is connected between the first coil of the choke coil and a first flywheel diode; a second switching element is connected between a second coil of the choke coil and a second flywheel diode; and ON/OFF of the first and second switching elements is controlled dependent on the voltage provided from the choke coil.

Therefore, according to the present invention, a desired DC voltage can be obtained by controlling ON/OFF of the first and second switching elements.

In a preferred embodiment, the voltage provided from the choke coil is subjected to voltage division, a diode element is rendered conductive in response to the voltage exceeding a predetermined level, and the first and second switching elements are rendered conductive in response to the conduction of the diode element.

In a more preferred embodiment, a transistor element is rendered conductive in response to the conduction of the diode element, and the first and second switching elements are rendered conductive by first and second reset diodes in response to the conduction of the transistor element.

In a more preferred embodiment, the voltage transformer includes a plurality of secondary coils, and a plurality of choke coils, a plurality of first and second flywheel diodes, a plurality of first and second switching elements and a plurality of control circuits are provided for the respective secondary coils.

Therefore, according to a more preferred embodiment of the present invention mentioned above, a plurality of mutually different DC voltages can be obtained.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram of waveforms (a)–(g) showing the operation of one embodiment of the present invention.

DESCRIPTION OF THE PREFERRED EMBODIMENTS

Figure 1:
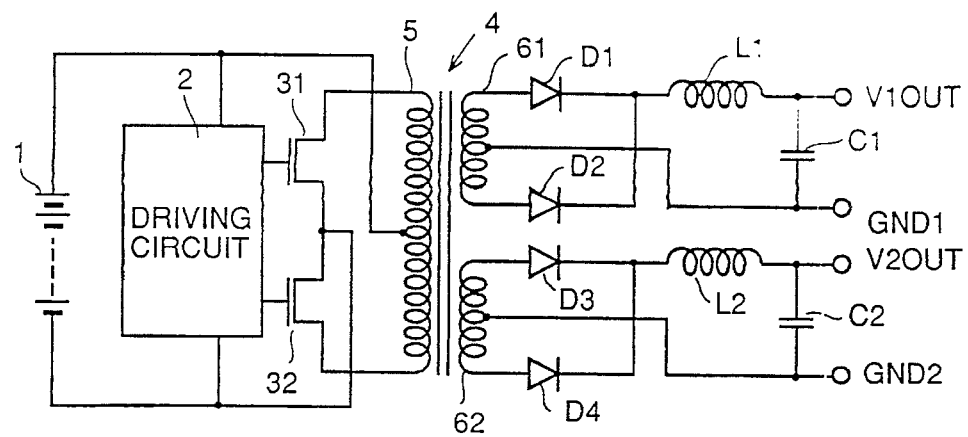
FIG. 1 is a schematic diagram showing a conventional voltage converter having a plurality of voltage outputs.
Figure 2:
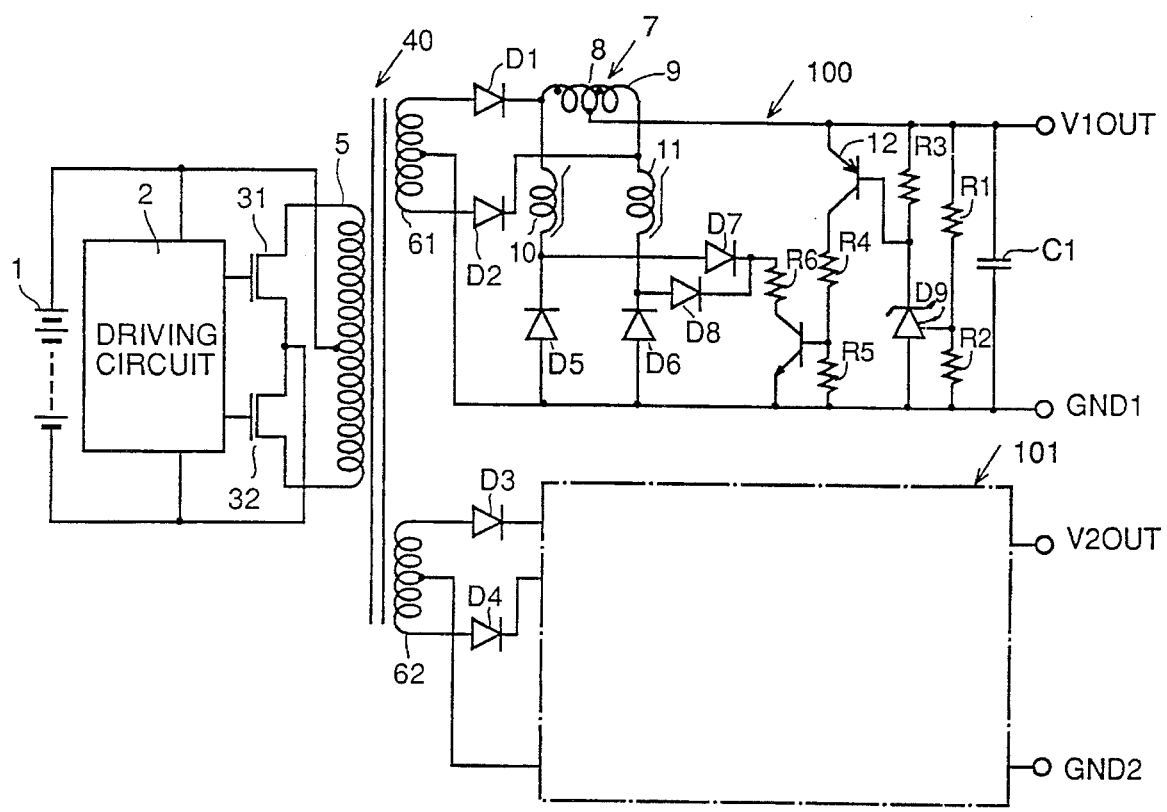
FIG. 2 is a schematic diagram showing an embodiment of the present invention.

FIG. 2 is a schematic diagram showing one embodiment of the present invention. Referring to the figure, DC power source 1, driving circuit 2 and FETs 31 and 32 are similar to those of FIG. 1. Voltage transformer 40 includes primary coil 5 as in the example of FIG. 1, and in addition, a plurality of, in this embodiment two, secondary coils 61 and 62. Secondary coil 61 has one end connected to an anode of rectifier diode D1, and the other end connected to an anode of rectifier diode D2. Rectifier diodes D1 and D2 have their cathodes connected to a control circuit 100. Control circuit 100 includes a choke coil 7 including a first coil 8 and a second coil 9 connected in series, in which first choke coil 8 has one end connected to a cathode of rectifier diode D1 and to one end of a saturable choke coil 10. Second coil 9 has one end connected to a cathode of rectifier diode D2 and to one end of saturable choke coil 11. Node between first coil 8 and second coil 9 is connected to a voltage output terminal V1 OUT.

Saturable choke coil 10 has the other end connected to a cathode of a flywheel diode D5 and to an anode of a reset diode D7, while saturable choke coil 11 has the other end connected to a cathode of a flywheel diode D6 and to an anode of a reset diode D8. A center tap of secondary coil 61 of voltage transformer 40 is connected to the ground terminal GND1. Between voltage output terminal V1 OUT and the ground terminal GND1, a smoothing capacitor C1 as well as a series circuit of resistors R1 and R2 are connected. Resistors R1 and R2 divide the output voltage and apply the divided voltage to a control input terminal of a Zener diode D9. A pnp transistor 12 has its base connected to a node between the cathode of Zener diode DQ and resistor R3, and its cathode connected to voltage output terminal V1 OUT. Between the collector of pnp transistor 12 and the ground line, a series circuit of resistors R4 and R5 is connected. At a node between resistors R4 and R5, the base of a npn transistor 13 is connected. The npn transistor 13 has its emitter connected to the ground line and its collector connected to cathodes of reset diodes D7 and D8 through resistor R6.

Another secondary coil 62 of voltage transformer 40 has one end connected to the anode of rectifier diode D3 and the other end connected to the anode of rectifier diode D4. Rectifier diodes D3 and D4 have their cathodes connected to a control circuit 101. Control circuit 101 has similar configuration as control circuit 100, and provides a DC voltage between voltage output terminal V2 OUT and the ground terminal GND2.

FIG. 3 is a diagram of waveforms (a)–(g) showing the operation of one embodiment of the present invention.

The operation of the voltage converter shown in FIG. 2 will be described with reference to FIG. 3. It is assumed that FET 31 turns on and off repeatedly as shown in FIG. 3(a), in response to a driving signal from driving circuit 2. When FET 31 turns on, a primary current flows through the upper side of primary coil 5 of voltage transformer 40, and a voltage represented by the dotted line of FIG. 3(b) is provided to upper portions of the secondary coils 61 and 62. The voltage is applied to the first coil 8 of choke coil 7 through rectifier diode D1, and therefore a current flows through the first coil 8. At this time, the voltage at one end of the first coil 8 is as represented by ① of FIG. 3(b), while the voltage at one end of the second coil 9 is as represented by ② shown in FIG. 3(d). Consequently, current flows through rectifier diode D1 and first coil 8, as shown in FIG. 3(c) while current does not flow through rectifier diode D2 and second coil 9.

Then, when FET 31 turns off and after a prescribed delay FET 32 turns on, a flyback voltage is generated at choke coil 7, the voltage at one end of first coil 8 lowers rapidly as shown in FIG. 3(b), while the voltage at one end of the second coil 9 rises quickly as shown in FIG. 3(d). The flyback voltage becomes higher than the output voltage of voltage transformer 40 shown by the solid line of FIG. 3(d), and as a result, rectifier diode D2 is set to the reverse bias state. Accordingly, any voltage cannot be taken out from voltage transformer 40. At the trailing edge of the pulse shown in FIG. 3(b), the flyback voltage becomes lower than the output voltage, a forward voltage is applied to rectifier diode D2, and current flows for a short period, as shown in FIG. 3(e). At this time, a saturable reactor 10 is reset at a timing of ③ of FIG. 3(f) and the cathode of flywheel diode D5 and one end of the first coil 8 are connected, the flyback voltage is clamped at the ground potential by flywheel diode D5, and the power is reproduced as the output. Consequently, the voltage at one end of the second coil 9 of choke coil 7 becomes lower than the output voltage of voltage transformer 40, rectifier diode D2 is rendered conductive, and a DC voltage is taken out from the node between the first coil 8 and the second coil 9 of choke coil 7. Accordingly, the period in which current flows becomes longer as shown in FIG. 3(g). Therefore, by appropriately resetting saturable choke coils 10 and 11, it is possible to adjust the output voltage.

The operation for resetting saturable choke coils 10 and 11 will be described. The DC voltage output at voltage output terminal V1 OUT is divided by resistors R1 and R2, and a constant voltage obtained by the voltage division is applied to a control input terminal of Zener diode D9. An output voltage is applied through resistor R3 to Zener diode D9, and when the output voltage exceeds a prescribed level, Zener diode D9 turns on, the base potential of pnp transistor 12 lowers and pnp transistor 12 turns on. Consequently, current flows to resistors R4 and R5, the voltage divided by resistors R4 and R5 rises, and npn transistor 13 also turns on. Then, saturable choke coils 10 and 11 are reset by resistor R6 through reset diodes D7 and D8.

In this embodiment, as the coil gap of voltage transformer 40 is appropriately adjusted, leakage flux is appropriately adjusted and the inductance of the choke coil 7 of the secondary rectifier is appropriately adjusted, so that even when FET 31 is kept on for a time period corresponding to reset amount of saturable choke coils 10 and 11, current does not flow to the primary coil 5 of voltage transformer 40. When flywheel diodes D5 and D6 are connected to choke coils 8 and 9, balance is disturbed, current flows to the primary coil 5 of voltage transformer 40, and a voltage appears on the output side. By detecting the output voltage and resetting saturable choke coils 10 and 11, the output voltage can be controlled, as the amount of reset is in inverse proportion to the output voltage.

In the embodiment shown in FIG. 2, the present invention was applied to voltage transformer 40 including a center tap type push pull circuit as primary coil 5 and a full-wave rectifier with a center tap type secondary coil. However, the present invention can be similarly applied to a bridge circuit or power converter type devices.

Though saturable choke coils 10 and 11 are provided as secondary side switching elements, other elements, such as transistor circuits may be used. Though choke coil 7 has been described as including two coils 8 and 9 wound in reverse directions, separate two choke coils may be used. Further, characteristics can be more delicately adjusted by separating nodes between rectifier diodes D1, D2 and saturable choke coils 10 and 11, by providing a tap amid the coil of choke coil 7.

According to this embodiment, small choke coil can sufficiently serves as saturable choke coils 10 and 11, since what is required is only to turn on/off the flyback power. Therefore, it does not increase the scale of the device, nor increase the cost. Further, since the primary current is turned ON/OFF with the voltage being almost zero, the switching loss can be minimized, and generation of noise can be significantly reduced as compared with the prior art.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A voltage converter switching a current flowing through a primary coil of a voltage transformer, full-wave rectifying a voltage output from a secondary coil and for outputting resulting DC voltage, comprising:

a choke coil including first and second coils, one end of each of said first and second coils being connected to each other, the other end of said first coil receiving one said rectified voltage, the other end of said second coil receiving another said rectified voltage, for providing an output voltage from a node between said first and second coils;

first and second flywheel diodes;

a first switching element connected between the other end of the first coil of said choke coil and said first flywheel diode;

a second switching element connected between the other end of the second coil of said choke coil and said second flywheel diode; and control means responsive to the output voltage from said node between said first and second coils for controlling ON/OFF of said first and second switching elements.

2. The voltage converter according to claim 1, wherein each of said first and second switching elements includes a saturable choke coil.

3. The voltage converter according to claim 1, wherein said control means includes voltage dividing means for dividing the output voltage from said choke coil, a diode element rendered conductive in response to the voltage divided by said voltage dividing means exceeding a predetermined voltage, and a driving circuit for rendering conductive said first and second switching elements in response to conduction of said diode element.

4. The voltage converter according to claim 3, wherein said driving circuit includes a transistor element rendered conductive in response to conduction of said diode element, a first reset diode for rendering conductive said first switching element in response to conduction of said transistor element, and a second reset diode for rendering conductive said second switching element in response to conduction of said transistor element.

5. A voltage converter switching a current flowing through a primary coil of a voltage transformer, full-wave rectifying a voltage output from a plurality of secondary coils and for outputting resulting DC voltages, each secondary coil having an associated secondary circuit comprising:

a choke coil including first and second coils, one end of each of said first and second coils being connected to each other, the other end of said first coil receiving one said rectified voltage, the other end of said second coil receiving another said rectified voltage, for providing an output voltage from a node between said first and second coils;

first and second flywheel diodes;

a first switching element connected between the other end of the first coil of said choke coil and said first flywheel diode;

a second switching element connected between the other end of the second coil of said choke coil and said second flywheel diode; and control means responsive to the output voltage from said node between said first and second coils for controlling ON/OFF of said first and second switching elements.

6. A voltage converter switching a current flowing through a primary coil of a voltage transformer, full-wave rectifying a voltage output from a secondary coil and for outputting resulting DC voltage, comprising:

a choke coil including first and second coils, one end of each of said first and second coils being connected to each other, the other end of said first coil receiving one said rectified voltage, the other end of the second coil receiving another said rectified voltage, for providing an output voltage from a node between said first and second coils;

first and second flywheel diodes;

a first saturable reactor connected between the other end of the first coil of said choke coil and the cathode of said first flywheel diode;

a second saturable reactor connected between the other end of the second coil of said choke coil and the cathode of said second flywheel diode; and control means responsive to the output voltage from said node between said first and second coils for controlling ON/OFF of said first and second saturable choke coils, said control means including first and second resistors arranged as a voltage divider for dividing the output voltage from said choke coil, a zener diode connected to a node between said first and second resistors and rendered conductive in response to the voltage divided by said voltage divider exceeding a predetermined voltage;

a transistor element rendered conductive in response to conduction of said diode element;

a first reset diode having the anode thereof connected to the first saturable reactor and the cathode thereof connected to said transistor element such that said first reset diode is rendered conductive in response to conduction of said transistor element; and a second reset diode having the anode thereof connected to the second saturable reactor and the cathode thereof connected to said transistor element such that said second reset diode is rendered conductive in response to conduction of said transistor element.

* * * * *